(No Model.)

C. E. ALDEN.
DRIVE CHAIN.

No. 336,779. Patented Feb. 23, 1886.

Witness:
Will S. Powell.
W. C. Chaffee

Inventor,
Charles E. Alden,
By Connolly Bros.,
Attorneys.

UNITED STATES PATENT OFFICE.

CHARLES E. ALDEN, OF PHILADELPHIA, PENNSYLVANIA.

DRIVE-CHAIN.

SPECIFICATION forming part of Letters Patent No. 336,779, dated February 23, 1886.

Application filed March 20, 1885. Serial No. 159,516. (No model.)

*To all whom it may concern:*

Be it known that I, CHARLES E. ALDEN, a citizen of the United States, residing at Philadelphia, in the county of Philadelphia and State of Pennsylvania, have invented certain new and useful Improvements in Drive-Chains; and I do hereby declare the following to be a full, clear, and exact description of the invention, reference being had to the accompanying drawings, which form part of this specification, in which—

Figure 1:
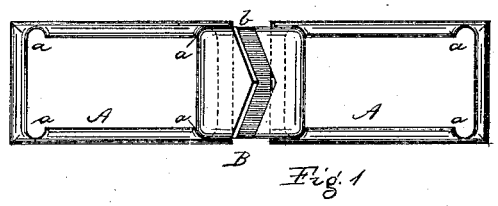
Figure 2:
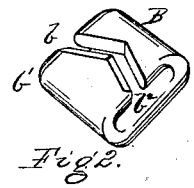
Figure 3:
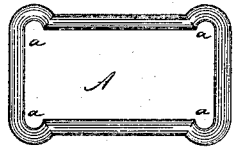
Figure 4:
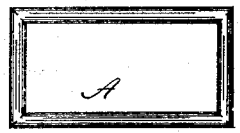

Figure 1 is a plan view of a section of chain. Fig. 2 is a perspective view of my coupler. Figs. 3 and 4 are views of different forms of links that may be used with my coupler.

My invention consists of a chain composed of links A A, united by couplings B B. The links are rectangular in plan, and their side and end pieces are designed to be round in transverse section. The couplings are of C form, and have a V-shaped slot, $b$, through which the links are admitted, one at a time, by a sidewise or lateral motion when standing perpendicular to said couplings. They may be withdrawn in like manner by a reverse motion; but said links and couplings cannot separate when in the same or in an approximate plane, or when the chain is in its ordinary working position. The couplings have rounded edges $b'$, brought to a point, $b^2$, at the entrance to the slot $b$. To prevent end thrust of the links, they may be formed with recesses $a\ a$ at each of their four corners, said recesses being concave to conform to the rounded or convex edges of the couplings which fit therein.

It should be observed that the coupling with the V-slot may be used with many other forms of links than that above described, and shown in the drawings. For example, a plain link like that shown in Fig. 4 may be used; hence I do not limit my claim on the coupling to its use or combination with any particular form of link.

In an application for Letters Patent for improvements in drive-chains, filed by me October 30, 1884, Serial No. 146,950, I have shown and described, but have not claimed, broadly, a coupler for drive-chains having a V-shaped groove for the introduction of links, having reserved to myself the right to make such broad claim in this application.

What I claim as my invention is as follows:

A coupling or connection for drive-chains having a V-shaped opening for the insertion and withdrawal of links, said coupling being made in a piece separate from the links and adapted to receive the contiguous end bars of two links, substantially as shown and described.

In testimony that I claim the foregoing I have hereunto set my hand this 13th day of March, A. D. 1885.

CHAS. E. ALDEN.

Witnesses:
WILL H. POWELL,
JOHN URIAN.